Patented Apr. 5, 1949

2,466,049

UNITED STATES PATENT OFFICE 2,466,049

PREPARATION OF CLAY CATALYSTS

Hubert A. Shabaker, Media, and George Alexander Mills, Ridley Park, Pa., and Ruth C. Denison, Wilmington, Del., assignors to Houdry Process Corporation, Wilmington, Del., a corporation of Delaware No Drawing. Application January 30, 1946, Serial No. 644,424

10 Claims. (Cl. 252—449)

The present invention relates generally to processes for the treatment of argilloferruginous substances and more particularly to the preparation of solid adsorbents specially useful as contact catalysts in the conversion of hydrocarbons.

It has heretofore been proposed to employ as contact masses in catalytic conversion of hydrocarbons certain natural earths and clays. Very few of such materials that have been tried in cracking, reforming or related reactions, have been found appropriate for the purpose, since in many instances catalysts formed therefrom were found to be substantially inert, or had a tendency to promote excessive deposition of coky substance which is not only undesirable on its own account, but such deposits also effects rapid decline in catalytic activity, necessitating frequent regeneration after comparatively short periods of on stream operation.

The value of a contact material as a catalyst in the processes referred to is dependent upon its capability of selectively forming from the charge stock optimum quantities of desired liquid hydrocarbons, such as products useful as motor fuel, with a minimum production of gas and coke. For instance, a contact material which is relatively inert catalytically, such as diatomaceous earth or kieselguhr, when attempted to be used in a cracking operation, yields products varying but little in quality and quantity from that obtained by thermal cracking in the absence of such contact material. On the other hand, there are contact materials of natural or synthetic origin which have the property of forming from petroleum hydrocarbon fractions large quantities of carbon and low molecular weight gases including hydrocarbon gases, at the expense of desired liquid fractions. Such contact materials likewise are not ordinarily useful or desirable as cracking or reforming catalysts.

Among the natural adsorptive materials which are either substantially inert or otherwise impractical because they produce large quantities of coke and/or gas compared to the gasoline yield, there are some clays including certain sub-bentonites which can be activated by known methods, such as acid treatment, to produce catalysts of acceptable quality. Many available clays, however, do not respond to the usual methods of activation to produce catalysts of acceptable performance and have therefore not entered into commercial use as cracking or reforming catalysts.

Naturally occurring clays are composed chiefly of hydrosilicates of aluminum but ordinarily contain besides the principal compounds and complexes of silica and alumina lesser proportions of compounds of iron, calcium, magnesium, etc. Some clays also may include among their lesser components, compounds of zirconium or titanium. In the selection of natural adsorptive materials for use as catalysts it has previously been observed in U. S. Patent 2,078,945 of Eugene J. Houdry, that the content of iron as ferric oxide has a critical relation to the capacity of the contact mass for regeneration without extensive loss in catalytic activity. The patent indicates that contact masses suitable for use as catalysts should not contain over 3% of iron oxide.

It has now been found in accordance with the present invention that by treatment of clay in dry form with chlorine gas at elevated temperature under conditions hereinafter described the iron compounds therein are volatilized or converted to a form whereby the same are readily and selectively removed. Such removal is effected without accompanying extraction of aluminum compounds to the extent that is encountered in severe or drastic acid treatment. To accomplish the purpose of the present invention it is important that the treatment with chlorine be carried out at a temperature of at least 1200° F. and below the temperature at which rapid shrinkage or substantial incipient fusion of the clay would result. Depending upon the individual characteristics of the clay, this fusion temperature generally will be above 1500° and up to about 1600-1650° F.

It is believed that the iron content of clay is composed of a portion which is loosely or exchangeably associated with the clay structure and can be readily removed by comparatively mild acid treatment. On the other hand, there is apparently also present in the clay certain iron components which are more intimately associated with the clay structure and more tenaciously held therein as in so called "isomorphous" form. Continued or more drastic acid treatment to remove the latter iron components results in excessive accompanying removal of the alumina content of the clay with consequent progressive reduction in catalytic activity and other important catalytic properties. By the use of the chlorine treatment at the described high temperatures, in accordance with the present invention, the more tenaciously bound or isomorphous iron components of the clay are selectively attacked without material loss of alumina. At temperatures of 1400-1500° F. practically all of the iron content of the clay including the more tenaciously bound iron is released by conversion to iron chloride, leaving at most an insignificant residual quantity of iron. At the lower treating temperatures within the described range it will be found advantageous to supplement the chlorine treatment by washing with dilute acid to remove the freed iron compounds that may adhere to the clay. In fact, it is preferred to employ the subsequent acid treatment even after the higher temperature chlorine treatment, since better catalysts are usually obtained in this manner.

Some types of clay in the raw state, because of rather low porosity, may be found difficult to penetrate by the chlorine vapors. In such instances it will be advantageous to pretreat the clay with dilute acid, which will open pores in the clay for better penetration by the chlorine. Such preliminary acid treatment as well as the subsequent acid leaching, if practiced, may be accomplished with dilute mineral acid or an organic acid which forms soluble iron salts or complexes, including lower aliphatic carboxylic acids such as oxalic and acetic as well as hydroxy acids including lactic and the so called sugar acids. The concentration of the acid and the extent of treatment may be such as is conventionally employed in the art for "acid-activation" in the manufacture of decolorizing clays. For instance, the preliminary acid treatment may be carried out on the clay in finely divided form while the clay is suspended in water as in the nature of a slurry, to which concentrated mineral acid such as hydrochloric or sulfuric is added, or dilute mineral acid may be added directly to the finely divided clay. In either case the ratio of acid to clay is preferably in the order of 30 to 40%. The mixture of clay and acid is preferably heated to about 160° F. to 210° F. for a period of two to twelve hours, thereafter washed in water and filtered. If desired, the clay may at this point be washed free of acid ions with accompanying extraction of soluble metal salts. The acid treated clay with or without purification by washing may then be dried by any known or desired manner. More concentrated or larger proportions of acid may be employed and/or higher temperatures including increased pressures, or longer periods of treatment up to the approximate limit where the combined effect tends to no longer selectively remove iron compounds without excessive removal of aluminum compounds. Acid treatments of clay such as for instance are described in U. S. Patents 1,397,113, 1,579,326, 1,642,871 are suitable. The acid pretreatment, of course, may be less severe than is required for activation, and may be sufficient only to open pores in the clay, allowing easy access of the gas or vapor employed in the process.

In accordance with our process the untreated clay or the above described acid treated clay in dry finely divided form, or preferably after being formed into aggregate masses or pieces as for instance by granulating, molding, extruding or the like (as is practiced in forming of clay catalysts) is subjected to the treatment with chlorine gas at the described temperature range. The iron compounds such as chlorides so formed are volatilized and any sublimed iron salts that remain deposited on the clay may be removed from the treated product by washing with a solvent therefor, or by treating with dilute acid, if desired alternated with water or solvent. The leaching step is advantageously employed to supplement removal of iron compounds, as above explained, even when higher treating temperatures remove most of the iron by volatilization. The acid or solvent employed is advantageously chosen so as to have a selective action on the iron compounds formed by the $Cl_2$ treatment without removing substantial quantities of the aluminum (or silicon) components of the product.

Although in certain known processes of hydrocarbon conversion the catalyst can be employed in the form of finely divided particles or powders suspended in the charge stock, in other procedures, as for instance in fixed or moving bed operations, the catalyst is preferably employed in the form of larger aggregates or agglomerated pieces such as pellets, tablets, coarse granules, or the like. In the latter case, the larger aggregates may be formed at any stage in the production of the final catalyst, but preferably immediately subsequent to the preliminary acid treatment, if practiced. These larger masses may be formed for instance by compressing the dry finely divided particles or powders in a pelleting machine or by previously wetting the dry, treated or untreated, clay with water or other inert liquid that will bind the small particles or powder into a cake which, after drying, can be broken up into granules or fragments of desired sizes or the wet mix can be formed into more regular shapes by molding including casting, extruding or the like. In instances where the described high temperature $Cl_2$ treatment is carried out on powder or fine particles, the cohesive properties of the clay may be affected, in which case it may be necessary to add a suitable binder or lubricant to assist in the forming operation, care being taken in selecting such ingredient and maintaining the addition at a minimum so as not to interfere with the catalytic activity of the formed mass, as for instance one can use a raw or acid activated clay of good cohesive properties as a binder for the treated clay. It is preferred, however, to carry out the described $Cl_2$ treatment of the clay while in the form of tablets, granules, pellets or other agglomerate masses particularly if the final catalyst is to take the form of such larger aggregate. If the catalyst is to be employed in the hydrocarbon treating process in the form of fine particles or powders, formation of larger aggregates for treatment is not necessary, but, if desired, larger masses can be formed and treated in accordance with the above-described procedure and subsequently ground or comminuted to the required fineness.

Although the clay prepared by the described procedure has already been subjected to a high temperature treatment, it is still preferred as a final step in the preparation of catalysts, for use in hydrocarbon conversion process, to subject the treated clay to calcination at temperature above 800° F. in air with or without added steam or in steam alone.

The described treatment of the clay with chlorine may be used in combination with treatments with other gases or vapors reactive to release iron from the clay. For instance the raw clay or an acid-treated clay may be subjected to treatment at elevated temperature with a reducing gas such as hydrogen sulfide to form iron sulfides, which may then be removed from the clay by further treatment with chlorine to volatilize the iron as heretofore described, with or without subsequent acid leaching. Good results as to removal of iron and improvement in the catalytic properties of the clay have also been obtained by the use of the chlorine treatment followed by hydrogen sulfide, and subsequent acid leaching to remove the iron reaction products. The treatment with chlorine may also be preceded by calcination of the clay in air at temperatures in the order of 1000° to 1600° C., but not exceeding the temperature at which the individual clay is caused to shrink rapidly.

The treatment with chlorine as above described whether or not combined with other gaseous treatments or subsequent acid leaching is sufficiently prolonged to effect a reduction in the iron content of the clay to obtain a final product having less than 0.5% iron compounds calculated as $Fe_2O_3$ and often as low as 0.2% $Fe_2O_3$ or lower.

In the use of the catalysts according to the present invention, no change in conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 3, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

In the following examples notations of catalytic activity are expressed in terms of the standard test (CAT-A method) described in "Laboratory method for determining the activity of cracking catalysts" by J. Alexander and H. G. Shimp, page R537, National Petroleum News, August 2, 1944. In accordance with the method, a light gas oil is contacted with the catalyst under fixed cracking conditions and the activity of the catalyst is designated in terms of volume per cent of obtained gasoline; the weight per cent of wet gas, specific gravity of the gas, and weight per cent of carbonaceous deposit are also determined.

*Example I*

A sample of raw pelleted kaolin clay from Eccles property, Putnam County, Florida, was calcined in air at 1500° F. for two hours and then treated with an excess of chlorine gas for two hours at 1500° F. A large part of the iron was volatilized as ferric chloride. On analysis the original iron content of 1.4% $Fe_2O_3$ was found to have been reduced to .31%. The gasoline/gas and gasoline/coke ratio were decidedly improved, the coke production being substantially half of that obtained with clay from the same source only calcined in air at the above temperature.

The same calcined clay was brought to about 0.4 $Fe_2O_3$ by chlorine treatment at 1400° F. followed by acid leaching with 10% HCl at room temperature for about 24 hours. Tested on cracking of a light gas oil under standard conditions, there was obtained a yield of 34.7% by volume gasoline, whereas the original clay calcined in air showed a maximum activity of the order of 25-26% gasoline.

The original Eccles clay had the following analysis by weight (containing 10-20% sand): 65.3 $SiO_2$, 32.4 $Al_2O_3$, 1.4 $Fe_2O_3$, 0.23 CaO, .21 MgO, .69 $TiO_2$.

*Example II*

The calcined clay of the preceding example was treated for two hours with chlorine at 1500° F. followed by hydrogen sulfide for two hours at 1400° F. The pellets, after cooling, were soaked with an equal volume of 15% hydrochloric acid at room temperature over a period of 24 hours, the acid being changed once during the period. The acid leached product was then washed on a filter with water until it was free from chlorides, dried at moderate temperature and calcined in air at 1400° F. for ten hours in the presence of 5% steam. An analysis showed the iron content as .07% $Fe_2O_3$. Tested on cracking of a light gas oil, this catalyst produced 34.5% by volume gasoline, with the deposition of 1.6% by weight of coke and 4.5% by weight of gas of 1.57 gravity.

*Example III*

A raw kaolin clay from the same source as that in Example I was initially treated with 20% sulfuric acid for 4 hours at about 200° F. (using a total of 40% pure acid on clay weight), then washed, dried and formed into pellets. The pellets were treated with chlorine at 1400° F. for two hours. Analysis showed a content of 0.35% iron as $Fe_2O_3$. The improvement in catalytic properties is evident from the following tabulation comparing the catalyst with one prepared from the same clay and receiving only the acid treatment followed by air calcination at 1050° F. for two hours.

| Catalyst | Volume Per Cent Gasoline | Weight Per Cent Coke | Weight Per Cent Gas | Gas Grav. |
|---|---|---|---|---|
| Acid treated | 28.3 | 2.2 | 5.4 | 1.34 |
| Acid and chlorine treated | 30.7 | 1.8 | 4.7 | 1.35 |

*Example IV*

A sample of a commercial kaolin known as "Edgar EPK" was treated similarly to the clay product described in Example II. The original iron content of 1.0% $Fe_2O_3$ was reduced to .07%.

The raw clay had the following analysis by weight on a dry (105° C.) sand-free basis:

| | Percent |
|---|---|
| Ignition loss | 12.9 |
| $SiO_2$ | 46.6 |
| $Al_2O_3$ | 38.8 |
| $Fe_2O_3$ | 1.0 |
| CaO | 0.44 |
| MgO | 0.23 |
| $TiO_2$ | 0.35 |
| Alk. metal (as oxides) | 0.52 |

The selectivity of the chlorine treatment to remove iron without substantial effect on the alumina will be evident from the following. The clay of Example I after treatment still contained over 30% alumina. The clay of Example IV treated with chlorine at 1400° F. to reduce the iron content to 0.44% Fe₂O₃ showed no appreciable change on analysis, of the alumina content of the clay residue.

The advantages of the present invention are particularly important from the standpoint of obtaining active catalysts having desirable selectivity from clays such as those of the kaolinite type which do not respond to desired extent to conventional acid activation. The field of choice for raw clays useful in the preparation of catalysts is accordingly extended to include a large variety of common clays having a wide distribution. Moreover, catalysts prepared from kaolin clays have a comparatively high density and superior heat capacity, and are able to withstand higher temperatures without substantial shrinkage or loss of activity which constitute important considerations in their use as hydrocarbon conversion catalysts.

The invention, however, is not restricted to the particular types of clay identified in the above examples, but includes the treatment by the described methods of clays in general, such as those of the montmorillonite type. The same conditions and methods of treatment may be employed in the modification of these clays and the removal of iron therefrom as set out in connection with the specified clays of the examples.

Obviously many modifications and variations of the invention as hereinbefore set forth may be made without departing from the spirit and scope thereof and therefore only such limitations should be imposed as are indicated in the appended claims.

Treatment of clays with chlorine is also described among other reactive gases therein named, in our copending application, Serial No. 644,421 filed of even date herewith.

We claim as our invention:

1. The process of treating clay containing iron compounds which comprises subjecting the clay in dry form to an atmosphere of chlorine at a temperature of at least 1200° F., and below the temperature at which substantial incipient fusion of the clay would result, thereby effecting reaction between elemental chlorine and the iron compounds of the clay, and leaching from the clay soluble reaction products thus formed.

2. The process of activating kaolin which comprises subjecting the kaolin to contact with chlorine gas at a temperature of at least 1200° F. and insufficiently high to cause rapid shrinkage of the clay, and leaching the clay with dilute acid.

3. The process in accordance with claim 2 wherein the defined leaching involves the use of dilute mineral acid at substantially room temperature.

4. The method of preparing catalysts which comprises subjecting preformed pieces of clay to contact with elemental chlorine at a temperature between 1200°–1600° F., and leaching the clay with dilute mineral acid.

5. The method of preparing active catalysts which comprises subjecting a kaolin clay in pellet form to contact with an atmosphere consisting substantially of chlorine gas at a temperature between 1200°–1600° F. and then acid-treating the resultant product, with substantial disintegration of the pellets.

6. The method of preparing active catalysts which comprises subjecting preformed and calcined masses of kaolin clay to contact with an atmosphere of chlorine gas at a temperature between 1200°–1600° F. for several hours, treating the resultant product with dilute mineral acid without substantial disintegration of said masses, thereafter washing, drying and calcining the masses in air.

7. The method of removing iron compounds from clays containing the same which comprises alternately subjecting the clay in selected sequence to contact with vapors of hydrogen sulfide and chlorine, each of these treatments being effected at a temperature in the range of 1200°–1600° F., and subsequently leaching the clay with dilute acid.

8. The method of preparing active catalysts from kaolin, which comprises treating the kaolin in finely divided form with diluted acid, freeing the product of acid, forming the resultant product into aggregates, and treating the aggregates with chlorine at elevated temperature in the range of 1400° F. to 1600° F., and acid leaching the treated aggregates without substantial disintegration thereof.

9. The method of preparing active catalysts of low iron content from clays containing at least one percent of iron compounds expressed as Fe₂O₃, which comprises subjecting such a clay to contact with chlorine gas at elevated temperature in the range of 1400°–1600° F. for a period sufficient to diminish the iron content not to exceed 0.5% Fe₂O₃ on a dry clay basis, and thereafter leaching the treated clay with dilute mineral acid at substantially room temperature.

10. The method of removing contaminant iron compounds from catalysts consisting essentially of hydrosilicates of aluminum, which comprises subjecting the catalyst to an atmosphere of chlorine gas at a temperature of at least 1400° F. and below that causing substantial incipient fusion of the catalyst, thereby effecting reaction between the chlorine and the iron compounds, and leaching the catalyst with dilute mineral acid at room temperature.

HUBERT A. SHABAKER.
GEORGE ALEXANDER MILLS.
RUTH C. DENISON.

REFERENCES CITED

The following references are of record in the file of this patent:

UNITED STATES PATENTS

| Number | Name | Date |
|---|---|---|
| 1,999,773 | McMichael | Apr. 30, 1935 |
| 2,030,868 | Hart | Feb. 18, 1936 |
| 2,322,674 | Thomas | June 22, 1943 |
| 2,388,302 | Weyl | Nov. 6, 1945 |
| 2,391,312 | Ewing et al. | Dec. 18, 1945 |

FOREIGN PATENTS

| Number | Country | Date |
|---|---|---|
| 325,386 | Great Britain | Feb. 20, 1930 |
| 349,033 | Great Britain | May 19, 1931 |

Certificate of Correction

April 5, 1949.

Patent No. 2,466,049.

HUBERT A. SHABAKER, ET AL.

It is hereby certified that errors appear in the printed specification of the above numbered patent requiring correction as follows:

Column 7, line 11, for "kaolinite" read *kaolin*; column 8, line 2, claim 5, for the word "with" read *without*;

and that the said Letters Patent should be read with these corrections therein that the same may conform to the record of the case in the Patent Office.

Signed and sealed this 27th day of September, A. D. 1949.

[SEAL]

THOMAS F. MURPHY,
*Assistant Commissioner of Patents.*